March 22, 1960   C. DECROLY ET AL   2,929,691
APPARATUS FOR TREATING FLUORIDES BY SUBLIMATION
Filed Sept. 24, 1956   2 Sheets-Sheet 1

INVENTORS
C. DECROLY
D. TYTGAT
J. GERARD

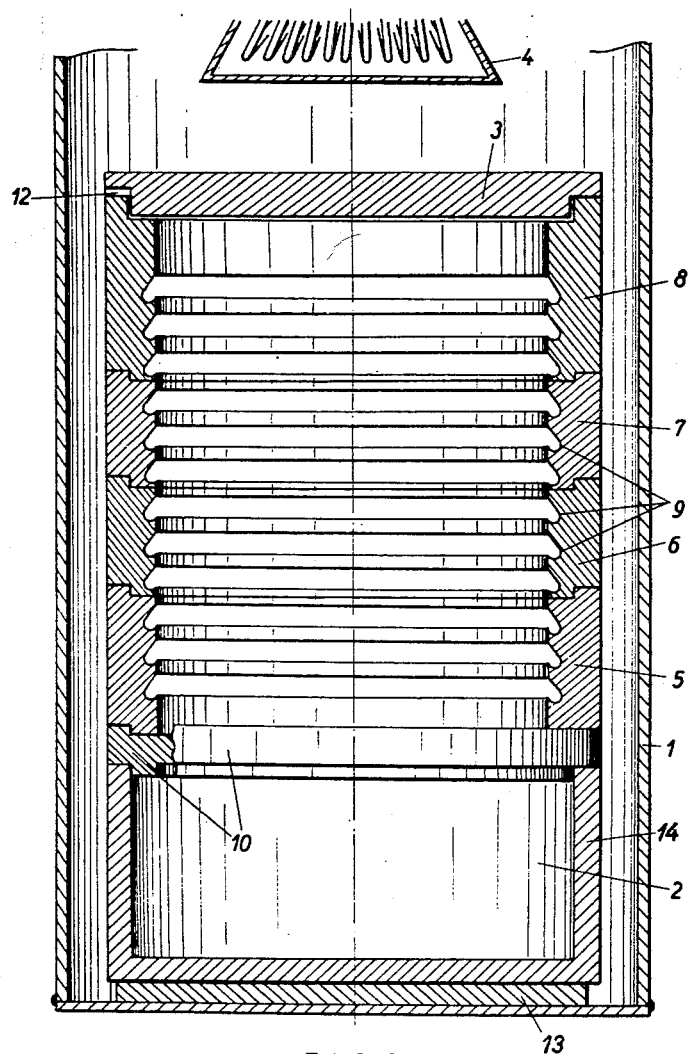
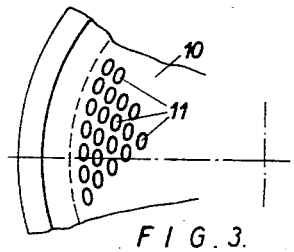
FIG.3.
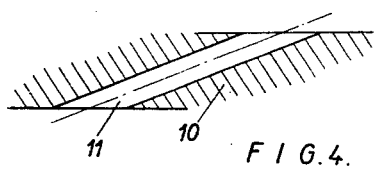
FIG.4.
FIG.2.
INVENTORS
C. DECROLY
D. TYTGAT
J. GERARD

United States Patent Office 2,929,691
Patented Mar. 22, 1960

2,929,691
APPARATUS FOR TREATING FLUORIDES BY SUBLIMATION

Claude Decroly, Denis Tytgat, and Jean Gerard, Brussels, Belgium, assignors to Centre d'Etudes pour les Applications de l'Energie Nucléaire, Brussels, Belgium, an association Application September 24, 1956, Serial No. 611,584

Claims priority, application Belgium September 30, 1955

1 Claim. (Cl. 23—273)

This invention relates to an apparatus for treating fluorides by sublimation, particularly fluorides of volatile metals, for example zinc fluoride, but also some other fluorides, such as zirconium fluoride.

The fluorides obtained by sublimation are often impure, so that they are not suitable for some uses. The present invention has for its object to eliminate this disadvantage. For this purpose, the apparatus for treating fluorides by sublimation according to the invention comprises a heated evacuated enclosure, a vessel arranged in said enclosure for holding the fluoride batch to be treated, a condensing plate closing said vessel in a non-sealing way, a cooling device placed at some distance away from said condensing plate, and a plate placed in said vessel on the path of the fluoride vapors, said plate having rows of skew holes, the walls of which form guiding surfaces making substantially helical the upwards movement of the fluoride vapors so as to bring against the vessel walls the non-volatile impurities contained in said vapors.

Other details and features of the invention will be apparent from the description of the accompanying drawings, which show by way of nonlimitative examples, a particular embodiment of an apparatus according to the invention.

Figure 2 is a view similar to Figure 1, showing an embodiment according to the invention.

Figure 3 is a plan view, with some parts broken away, of an element of the apparatus shown in Figure 2.

Figure 4 is a view in section and in elevation, on a larger scale, of part of the element shown in Figure 3.

In the various figures, the same reference numerals relate to similar elements.

Figure 1:
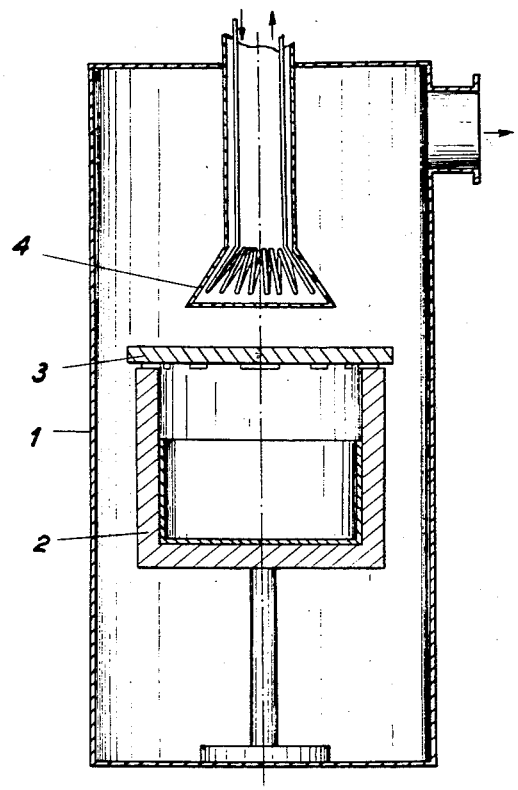
Figure 1 is a schematical vertical section of an apparatus for treating fluorides by sublimation.

The apparatus shown in Figure 1 is designed for submitting a fluoride produced for instance by dry-processing, to a sublimation operation under a high vacuum. As a rule, it is better to design the apparatus in such a way that the vapors do never contact metallic surfaces, especially when processing a fluoride of a volatile metal, such as zinc fluoride for example. Indeed, at high temperature, such fluorides may be reduced by many non-volatile metals.

The apparatus shown comprises a cylindrical enclosure 1 made of stainless steel, which enclosure may be connected to a pumping system providing an adequate vacuum and which may be heated. In the enclosure 1 is arranged a vessel 2 for holding the fluoride batch to be treated. This vessel may be made either of graphite or of stainless steel lined on the inside with sintered calcium fluoride, or still of some other adequate material withstanding the action of the fluoride to be treated.

The vessel 2 is topped by a condensing plate 3 made of graphite, closing in a non-sealing way said vessel 2.

This condensing plate will be made of graphite for the fluorides of volatile metals, of graphite or nickel or any other material withstanding the action of the fluorides to be treated, for the fluorides of non-volatile metals.

The condensing plate 3 is cooled indirectly by a cooling device 4, with water circulation, which is provided some distance above the plate 3. By varying the distance between the device 4 and the plate 3, it is possible to set very precisely the temperature of the condensing plate.

For given values of temperature in the vessel 2 and pressure in the enclosure 1, it is possible to set the temperature of the condensing plate 3 so as to determine the temperature gradient from the bottom of the vessel 2 to the plate 3. It is by determining this gradient that it is possible to obtain on the plate 3 a fluoride that is pure and dense enough.

The apparatus described may be used for treating various fluorides. The conditions of temperature and pressure to be chosen are of course subordinated to the fluoride to be treated.

The features of the invention appear clearly in the Figures 2 to 4. The main elements of the apparatus shown in Figure 1 are found again, but the vessel 2 which lies over a refractory plate 13, on the bottom of the enclosure 1, is made up of a plurality of parts bearing the references 5, 6, 7, 8 and 14. Between the lower part 5 and the bottom part 14 of the vessel 2 are interposed one or several graphite plates 10 provided with cylindrical holes 11, having a diameter of approximately 5.0 millimeters and the axis of which have, for example, an angularity of 70° with respect to the axis of the vessel 2. Moreover, each axis is located in the plane which is tangential with the imaginary cylindrical surface having for its axis the one of the vessel 2 and going through the center of the middle cross-section of the corresponding hole. The holes are preferably arranged in concentric rows and their number is chosen as large as possible, but is limited to a value consistent with the mechanical strength of graphite. The vapors of fluorides generated and passing through the plate or plates 10, are thus given an helical displacement which throws the non-volatile impurities carried away by these vapors, against the inside walls of parts 5 to 8. Circular or helical grooves 9 are provided in these walls, so as to form recesses into which are deposited said non-volatile impurities. It is thus possible to recover, on the condensing plate 3, a fluoride that is free from those non-volatile impurities, which enables to treat batches containing such impurities without finding these latter ones in the sublimated fluoride.

The condensing plate 3 lies here directly on the upper edges of the upper part 8, but holes such as 12 are provided for leaving a passage between the vessel 2 and the enclosure 1 which surrounds it. By constructing the vessel 2 in several sections, the assembly is made easier, especially as regards the plate or plates 10, as well as forming the grooves 9.

The apparatus which has been described make it thus possible to obtain a purification and an increase in density of the fluorides treated which are particularly interesting, especially for some uses in the nuclear techniques.

It must be understood that the invention is in no way limited to the embodiment described and that many changes may be brought therein without departing from the scope of this invention.

We claim:

Apparatus for treating fluorides by sublimation, which comprises a heated evacuated enclosure, a vessel arranged in said enclosure for holding the fluoride batch to be treated, a condensing plate closing said vessel in a non-sealing way, a cooling device placed at some distance away from said condensing plate, and a plate placed in said vessel on the path of the fluoride vapors, said plate having rows of skew holes, the walls of which form guiding surfaces making substantially helical the upwards movement of the fluoride vapors so as to bring against the vessel walls the non-volatile impurities contained in said vapors.

References Cited in the file of this patent

UNITED STATES PATENTS

| | | |
|---|---|---|
| 1,450,464 | Thompson | Apr. 3, 1923 |
| 1,482,684 | Hortvet | Feb. 5, 1924 |
| 1,644,518 | Field | Oct. 4, 1927 |
| 2,762,688 | Wainer | Sept. 11, 1956 |

FOREIGN PATENTS

| | | |
|---|---|---|
| 253,156 | Germany | Nov. 4, 1912 |

OTHER REFERENCES

Mellor: "Inorganic and Theoretical Chemistry," 1927, vol. 7, pages 137–138, and vol. 4, pages 533–534.

Perry: "Chem. Eng. Handbook," 1950, pages 663–665.